(12) United States Patent
Dall'omo et al.

(10) Patent No.: US 7,452,178 B2
(45) Date of Patent: Nov. 18, 2008

(54) UNIT AND METHOD FOR FORMING PACKS OF PRODUCTS FOR A PACKAGING MACHINE

(75) Inventors: Davide Dall'omo, Bologna (IT); Christian Zagnoni, Calcara di Crespellano (IT)

(73) Assignee: Tissue Machinery Company, S.p.A., Bologna (IT)

( * ) Notice: Subject to any disclaimer, the term of this patent is extended or adjusted under 35 U.S.C. 154(b) by 215 days.

(21) Appl. No.: 11/350,003

(22) Filed: Feb. 8, 2006

(65) Prior Publication Data
US 2007/0107385 A1 May 17, 2007

(30) Foreign Application Priority Data
Oct. 14, 2005 (IT) .......................... BO2005A0619

(51) Int. Cl.
*B65G 57/00* (2006.01)
(52) U.S. Cl. .............. 414/789.6; 414/789.8; 414/788.9; 198/575; 198/578
(58) Field of Classification Search .............. 414/788.9, 414/789.6, 789.8, 789.9; 198/575, 578, 592
See application file for complete search history.

(56) References Cited
U.S. PATENT DOCUMENTS

| | | | |
|---|---|---|---|
| 3,785,508 A * | 1/1974 | Hayden .................... | 414/789.6 |
| 4,124,967 A * | 11/1978 | Beer et al. ..................... | 53/446 |
| 4,413,462 A | 11/1983 | Rose | |
| 5,078,255 A * | 1/1992 | Haley .......................... | 198/358 |
| 5,092,448 A | 3/1992 | Cinotti | |
| 5,269,646 A * | 12/1993 | Focke ...................... | 414/796.2 |
| 5,433,063 A * | 7/1995 | Kovacs et al. ................. | 53/550 |
| 5,909,796 A * | 6/1999 | Soldavini ................. | 198/369.2 |
| 5,913,656 A * | 6/1999 | Collins ........................ | 414/801 |
| 5,961,274 A * | 10/1999 | Bors .......................... | 414/791 |
| 6,619,017 B2 * | 9/2003 | Franzaroli .................... | 53/435 |
| 7,156,606 B2 * | 1/2007 | Bridier et al. ............ | 414/789.6 |

FOREIGN PATENT DOCUMENTS

| | | |
|---|---|---|
| EP | 1 270 423 | 1/2003 |
| GB | 1 457 624 | 12/1976 |
| IT | RE2001A000121 | 6/2003 |

* cited by examiner

Primary Examiner—Douglas A Hess
(74) Attorney, Agent, or Firm—Fay Sharpe LLP

(57) ABSTRACT

A unit for forming packs of products for a packaging machine comprises at least three feed surfaces (3, 4, 5) for layers of products (2) and a receiving station (6) for the layers of products (2). The receiving station (6) comprises an elevator (7), mobile only between a position for loading the products (2) and a position for releasing the products (2), to transfer the layers of products (2) to a packaging machine (8). The three feed surfaces (3, 4, 5) comprise synchronization means so that they simultaneously release the respective layers of products (2) onto the elevator (7).

21 Claims, 5 Drawing Sheets

UNIT AND METHOD FOR FORMING PACKS OF PRODUCTS FOR A PACKAGING MACHINE

DISCLOSURE OF THE INVENTION

The present invention relates to a unit for forming packs of products for a packaging machine and to a related method for forming packs of products.

The present invention is used in particular in the sector for forming packs of products in rolls placed on top of one another, the rolls consisting for example of strips of toilet paper or kitchen paper.

In said technical sector, the rolls of products are normally packaged in packs containing a considerable number of rolls, usually a dozen. To make these packs easy to handle and transport, the rolls are normally packaged in layers on top of one another.

There are known devices, called forming units by experts in the field, for stacking layers of rolls, fed one at a time and one after another from a roll production unit located upstream of the forming unit.

The rolls, stacked in layers by said forming units, are then transferred to a packaging unit which packages them with a material from a web.

There are known forming units comprising a conveyor belt along which groups of rolls are fed one after another towards a receiving station. The receiving station comprises an elevator aligned with the conveyor belt. The latter transfers a first group of rolls to the elevator which, once it has received the rolls, is lowered to receive another group of rolls from the conveyor belt. Said additional group of rolls is therefore positioned on the first group already present on the elevator. This operation is repeated until the desired number of layers of rolls on top of one another is reached. At this point, the conveyor belt is stopped and the elevator is lifted beyond the belt to release the group of rolls to a packaging unit.

However, these forming units, for example known from patent application RE2001A000121 by the Applicant, have several disadvantages.

Placing one layer on top of another on the elevator is problematic due to interference between the rolls caused by the rolls in different layers sliding relative to one another.

Moreover, in such forming units very high production rates for layers on top of one another are impossible, because the elevator must be moved between placing two layers on top of one another on it.

SUMMARY OF THE INVENTION

In this context, the main purpose of the present invention is to propose a unit for forming packs of products for a packaging machine and a relative method for forming packs of products able to overcome the above-mentioned disadvantages.

In particular, the aim of the present invention is to propose a unit for forming packs of products for a packaging machine and a relative method for forming packs of products which allow a high production rate for layers of products on top of one another.

Another aim of the present invention is to provide a unit for forming packs of products for a packaging machine with low production and maintenance costs.

The purpose and aims specified above are substantially achieved by a unit for forming packs of products for a packaging machine and by a related method for forming packs of products with the technical characteristics described in one or more of the claims herein.

BRIEF DESCRIPTION OF THE DRAWINGS

Further characteristics and advantages of the present invention are more apparent in the non-limiting description of a preferred embodiment of a unit for forming packs of products for a packaging machine and of a relative method for forming packs of products, as illustrated in the accompanying drawings, in which.

DESCRIPTION OF THE PREFERRED EMBODIMENTS

Figure 1:
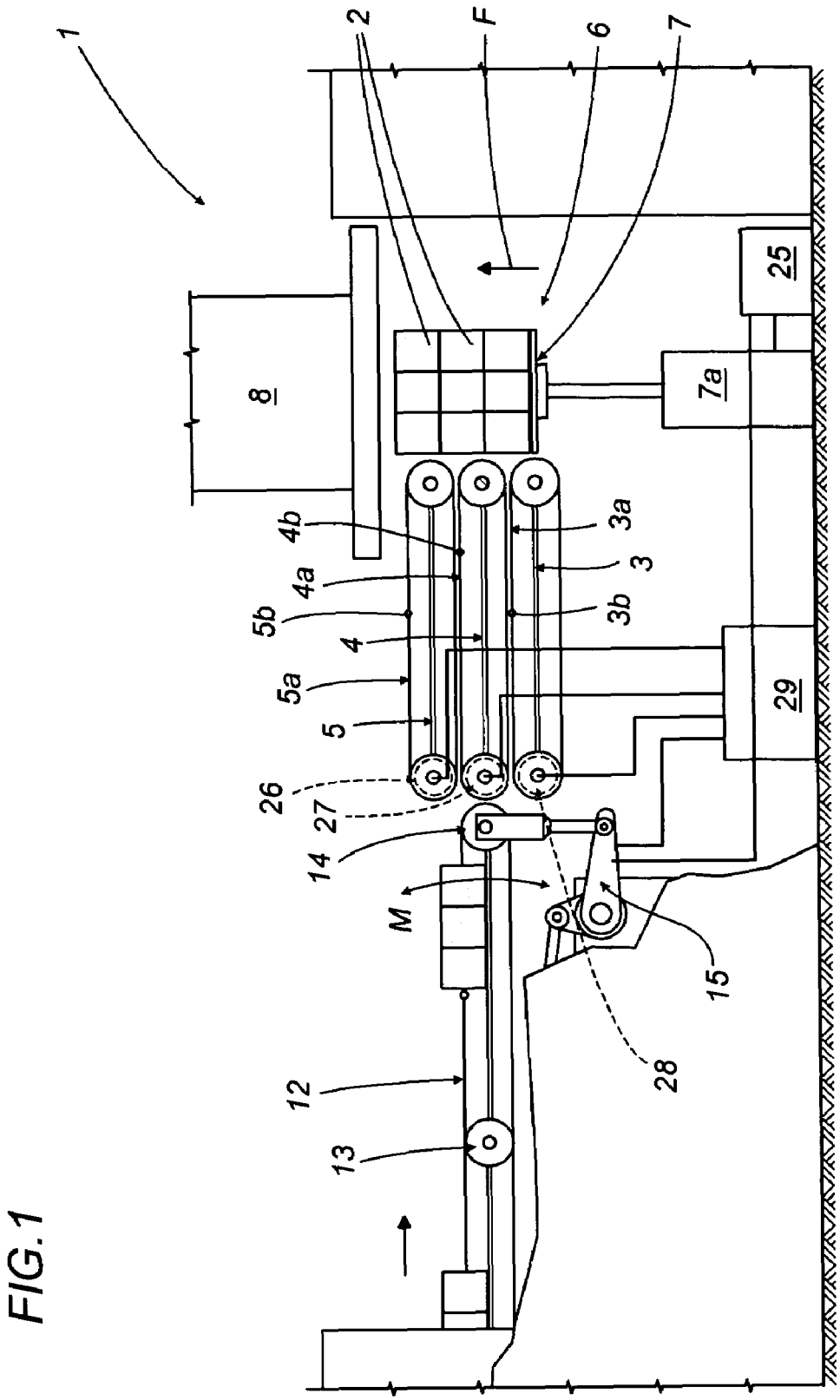
FIG. 1 is a schematic side view of a unit for forming packs of products for a packaging machine in accordance with the present invention, with some parts cut away to better illustrate others and in a first operating condition.

With reference to the accompanying drawings, the numeral 1 denotes as a whole a unit for forming packs of products for a packaging machine in accordance with the present invention.

In the preferred embodiment illustrated in the accompanying drawings, the products 2 are rolls of products, preferably toilet paper or kitchen paper.

The unit 1 comprises at least three feed surfaces 3, 4, 5 for layers of rolls 2 and a receiving station 6 for them. It should be noticed that the term layers of products, or rolls, in the context of the present invention refers to a group of products consisting of two or more units placed side by side.

The receiving station 6 comprises an elevator 7 for transferring the layers of products fed from the feed surfaces 3, 4, 5 to a packaging machine 8, schematically illustrated in FIG. 1, which packages the layers of products transferred from the elevator 7.

More specifically, from a structural viewpoint and as already indicated, the unit 1 comprises three surfaces, that is to say a first, second and third feed surface 3, 4, 5, parallel with and on top of one another, for feeding three layers of rolls 2 to the receiving station 6.

The elevator 7, in the position for receiving the rolls 2, is aligned with the first feed surface 3, as illustrated in FIG. 1, and is driven by motor means 7a.

As indicated, the feed surfaces 3, 4, 5 feed the receiving station 6 with rolls 2. For this purpose, the feed surfaces 3, 4, 5 consist of conveyor belts driven by motor means 11 which are preferably shared by all three feed surfaces 3, 4, 5.

The layers of rolls 2 are transferred to the feed surfaces 3, 4, 5 from a single conveyor surface 12 which links a machine that produces the rolls 2 one after another (machine not illustrated) to the feed surfaces 3, 4, 5.

In order to feed all of the feed surfaces 3, 4, 5 with layers of rolls 2, the conveyor surface 12 comprises a first, fixed end 13 and a second, mobile end 14. The latter can be moved so that it is aligned with the first, second and third feed surfaces 3, 4, 5, in such a way as to supply layers of rolls 2 alternately to the first or second or third feed surface 3, 4, 5. The movement of the conveyor surface 12 (labeled with an arrow M in FIG. 1), is guaranteed by lifting means 15, which preferably consist of a crank and connecting rod type mechanism, as illustrated in FIG. 1. It must be emphasized that said lifting means 15 only act on the second, mobile end 14 of the conveyor surface 12.

As indicated, the layers of rolls 2 are fed to the receiving station 6 and transferred to the elevator 7 which, in the loading position, is aligned with the first feed surface 3.

Figure 2:
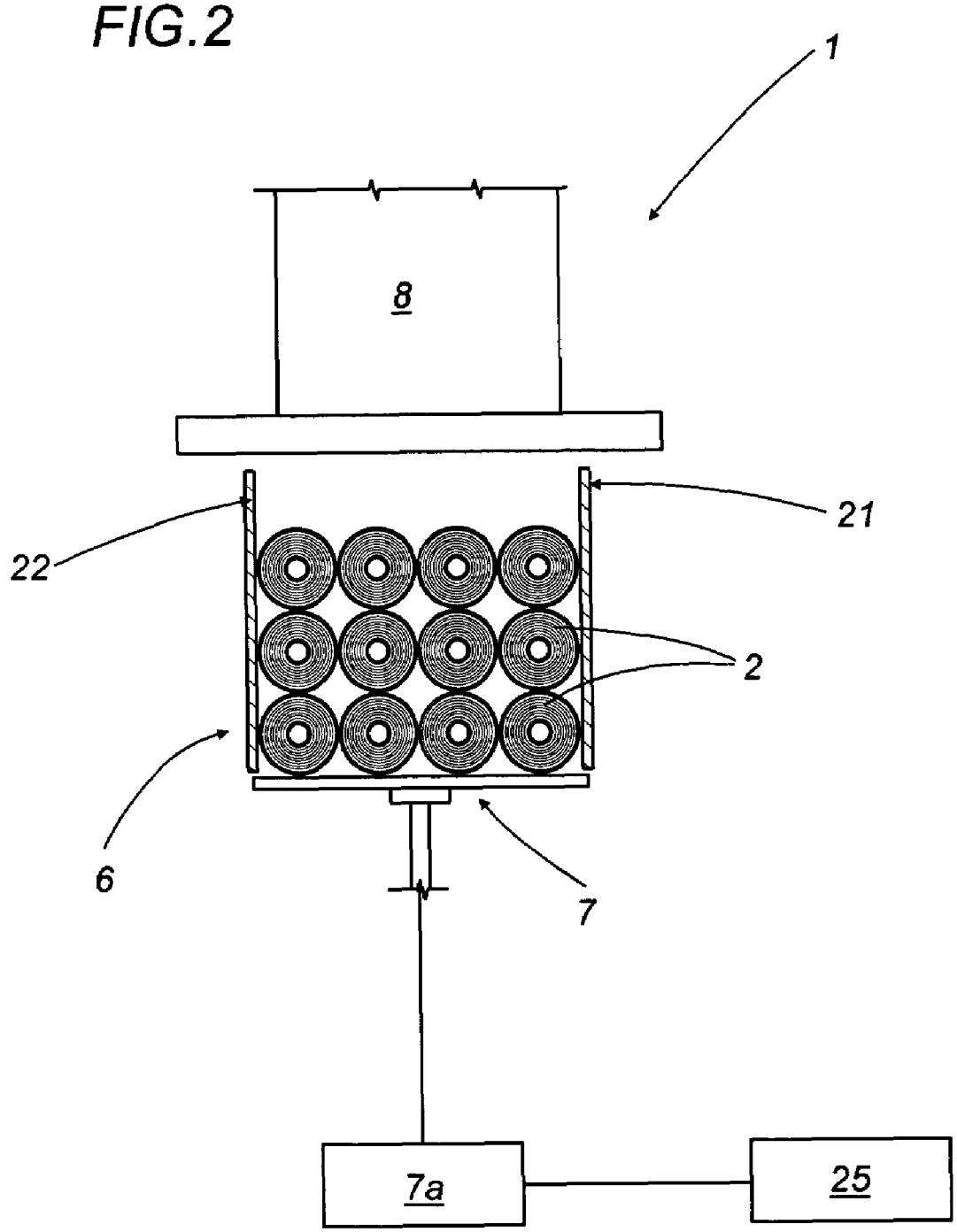
FIG. 2 is a front view of the unit illustrated in FIG. 1 in a second operating position.

Advantageously, the unit 1 also comprises (see FIG. 2), a first and a second wall 21, 22 for containing the layers of rolls 2 in the receiving station 6. In particular, the first and the second walls 21, 22 extend parallel with one another and transversally to the direction in which the rolls 2 are transported on the feed surfaces 3,4, 5.

The function of the containment walls 21, 22, as well as being to laterally constrain the layers of rolls 2 fed to the receiving station 6, may be to allow the rolls 2 to be compressed to form so-called space-saving packs.

For this purpose, the containment walls 21, 22 may be able to move towards one another, compressing the rolls 2 during said movement.

Figure 3:
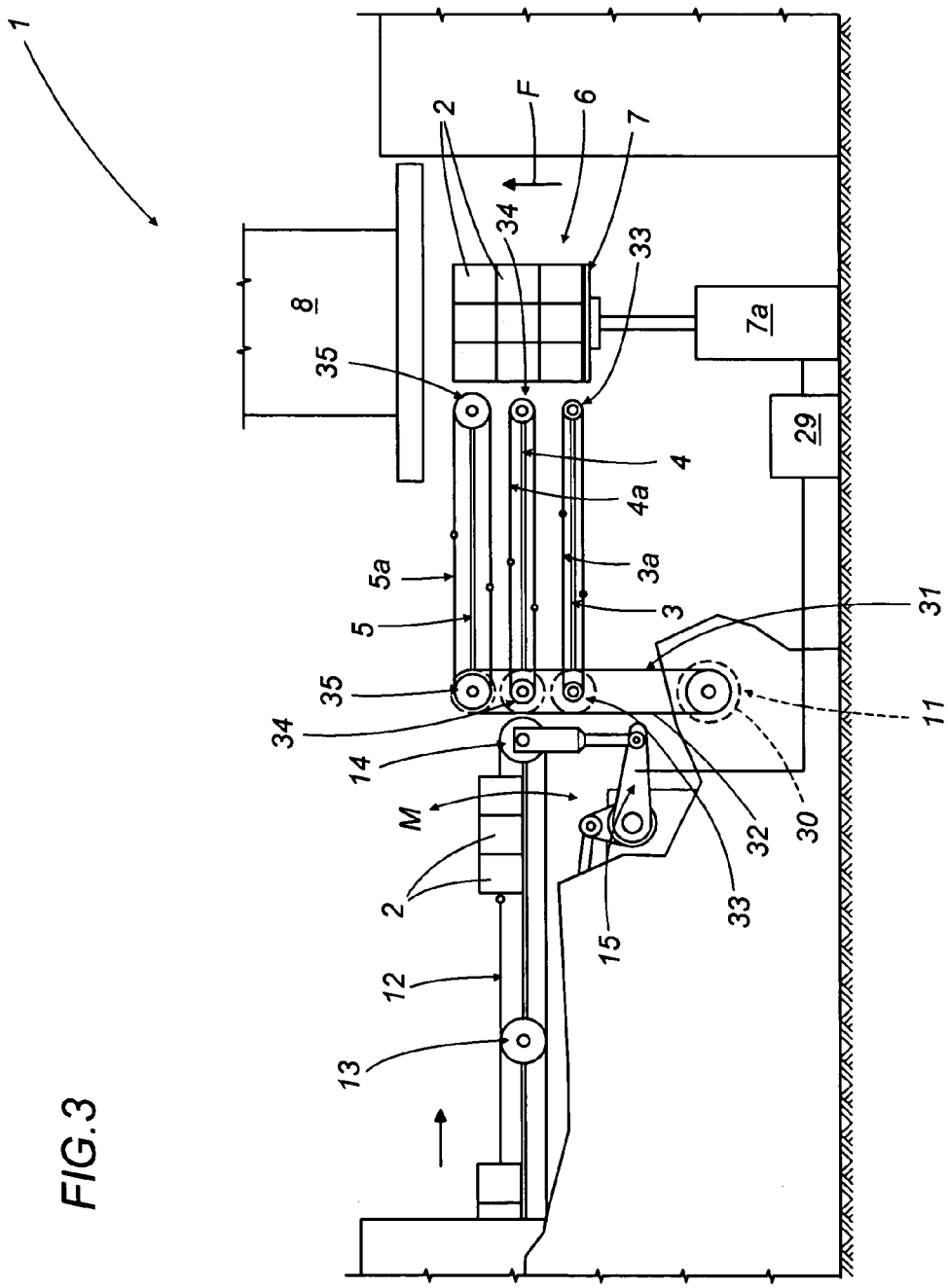
FIG. 3 illustrates an alternative embodiment of the unit for forming packs of products for the packaging machine illustrated in FIG. 1.
Figure 4:
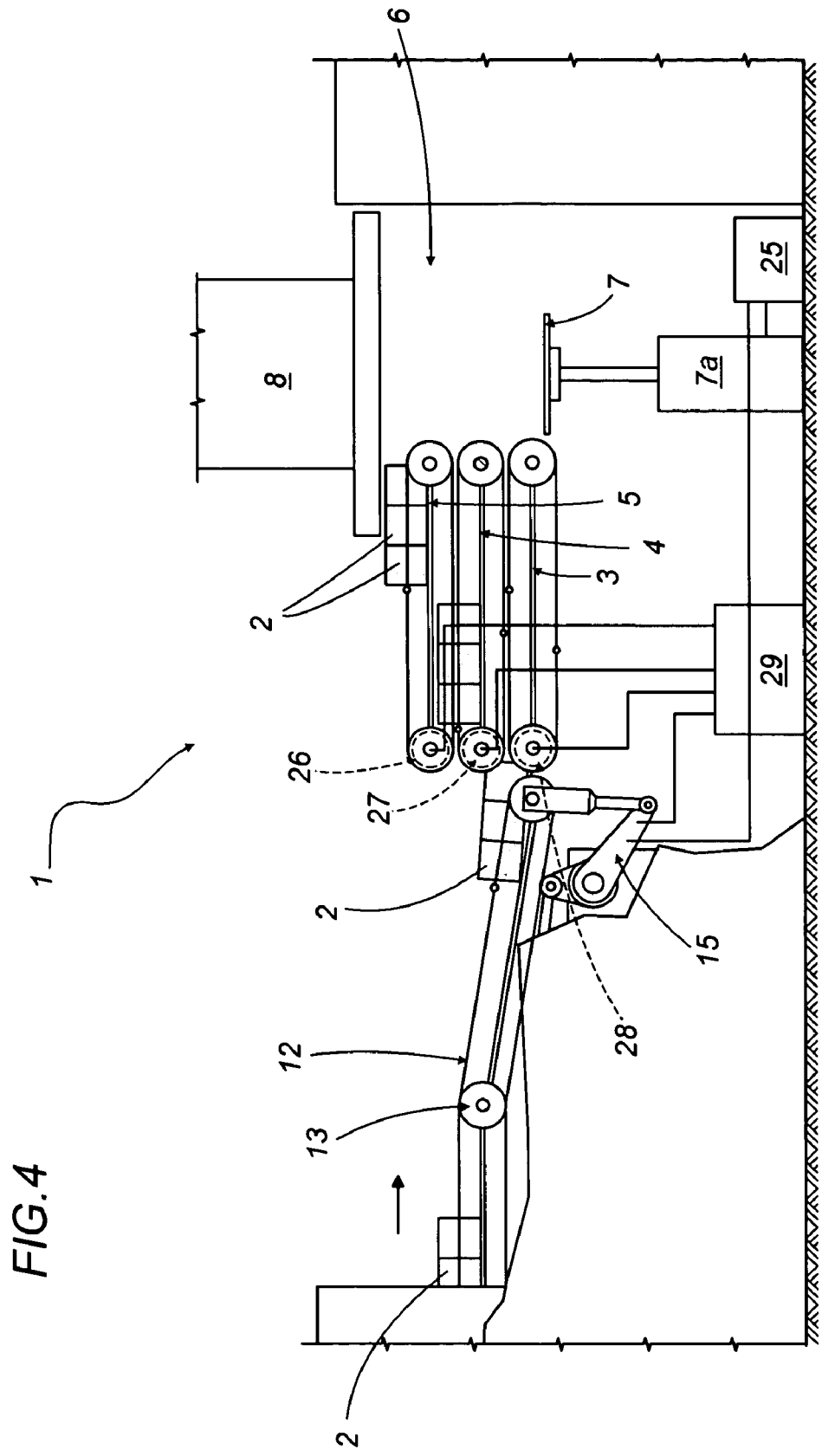
FIGS. 4 and 5 schematically illustrate the packaging machine illustrated in FIG. 1 in operation.
Figure 5:
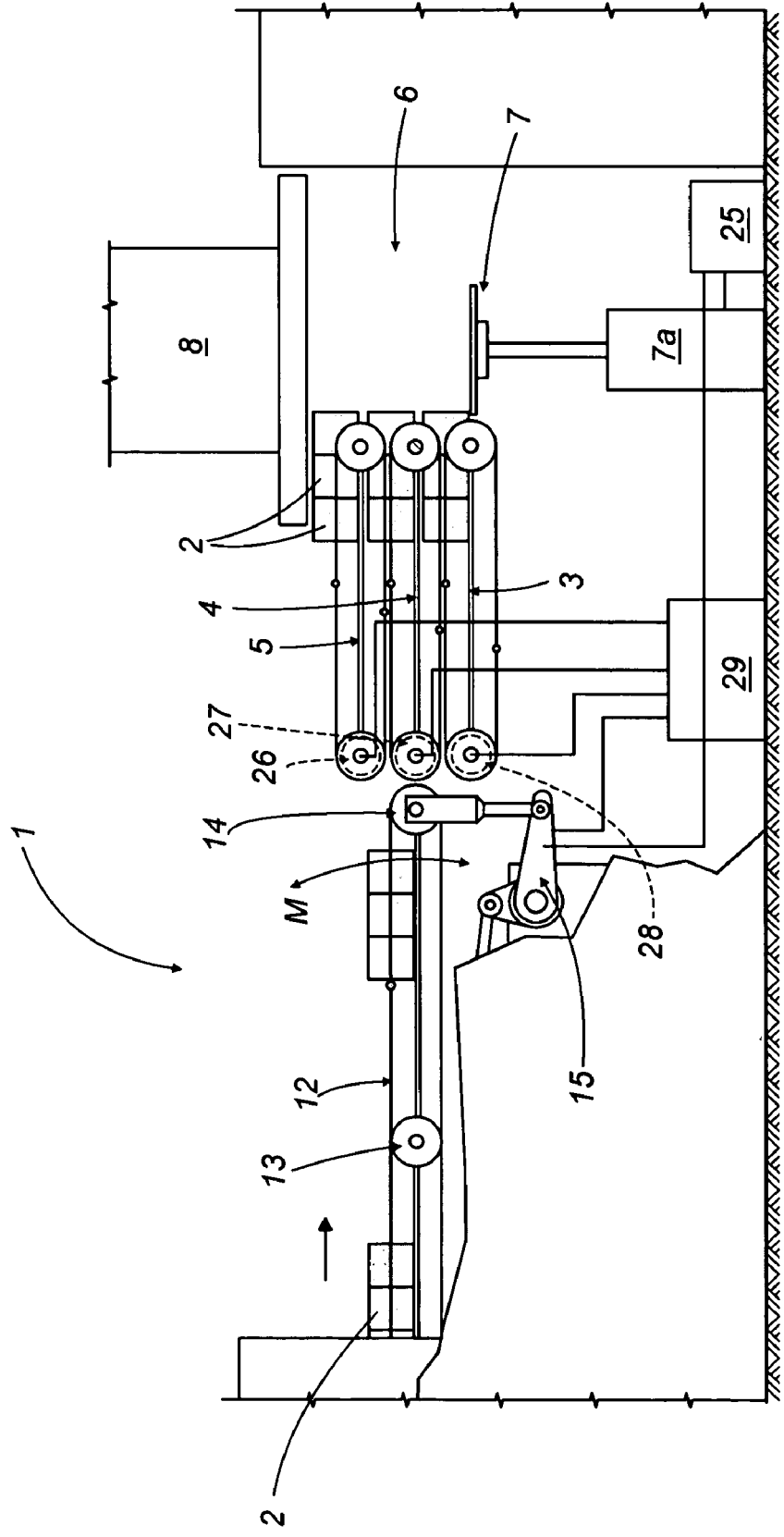

As is also shown in FIGS. 3 to 5, to avoid the rolls 2 sliding relative to one another during the release step, the unit 1 synchronizes the three feed surfaces 3, 4, 5 in such a way that the rolls 2 are released onto the elevator 7 at the same moment.

These feed surfaces 3, 4 and 5 may have, as an element for feeding the packs of products 2, a known system (see FIG. 1) consisting of a double endless chain 3a, 4a and 5a and crossmembers 3b, 4b, 5b which push the packs of products 2, the chains, as indicated below, being controlled by the system that synchronizes the surfaces 3, 4 and 5.

More specifically, synchronization allows the release of the pack of products 2 transported by the feed surface 5 which is the highest of the three feed surfaces 3, 4, 5, onto the pack of products 2 transported by the feed surface 4 located in the middle position, and the release of the pack of products 2 transported by the feed surface 4 located in the middle position onto the pack of products 2 transported by the feed surface 3 located in the lowest position.

The release of the various packs of products 2 onto the packs of products transported by the feed surfaces below is by gravity and at the elevator 7, so as to form a stack of packs of products consisting of three layers of products 2.

Said synchronization may be achieved for example using three independent motors 26, 27, 28, preferably electric, each connected to only one feed surface 3, 4, 5, as illustrated in FIG. 6.

The above-mentioned motors 26, 27, 28 are operatively connected to a control unit 29 which controls the speed of the feed surfaces 3, 4, 5 according to the movement of the conveyor surface 12. In other words, the control unit can define the interval of time which elapses between the release of one group of rolls 2 onto one of the feed surfaces and the release of another group of rolls 2 onto the next feed surface. Depending on this time interval, the control unit, through the three motors 26, 27, 28, controls the feed speed of the rolls 2 on each feed surface 3, 4, 5, guaranteeing that the groups of rolls 2 reach the end of the respective feed surfaces 3, 4, 5 at the same moment and are, therefore, placed on the elevator 7 simultaneously.

Advantageously, the time intervals which separate the release of one group of rolls 2 onto one of the feed surfaces and the release of another group of rolls 2 onto the next feed surface, do not necessarily have to be constant, since the control unit 29 is able to adjust the roll 2 transfer speed according to the current time interval.

Alternatively, as schematically illustrated in FIG. 7, synchronization is achieved using a single motor 30 operatively connected to all of the feed surfaces 3, 4, 5.

In this case, there are mechanical drive means 31 operatively connected between the motor 30 and the feed surfaces 3, 4, 5 for varying the speed of each feed surface 3, 4, 5.

In particular, the mechanical drive means 31 comprise a transmission chain 32, or the like, directly connected to the motor 30 and three reduction gears 33, 34, 35 each connected to the transmission chain 32 and to a single feed surface 3, 4, 5.

In this way, by suitably sizing the reduction gears 33, 34, 35, it is possible to move each feed surface 3, 4, 5 at a different speed to that of the other feed surfaces, guaranteeing that the rolls 2 simultaneously reach the end of the respective feed surfaces 3, 4, 5 and are therefore simultaneously placed on the elevator 7.

In practice, as shown in FIGS. 3, 4 and 5, the conveyor surface 12 is moved so that the free end 14 is aligned with one of the three feed surfaces 3, 4, 5, for example the first feed surface 3. A first sequence of rolls 2, that is to say, a first layer of rolls 2, is transferred to the feed surface 3 aligned with the conveyor surface 12 and is fed towards the receiving station 6. At the same time, the conveyor surface 12 is moved so that it is aligned with another feed surface, for example the second 4. A second layer of rolls 2 is then transferred to the feed surface 4 in question and is fed towards the receiving station 6. The conveyor surface 12 is then aligned with the remaining feed surface, which in the example described is the third 5, and a third layer of rolls 2 is fed towards the receiving station 6.

The three layers of rolls 2 therefore reach the receiving station 6 simultaneously and, one after another from above, drop onto one another at the elevator 7.

The elevator 7, which is aligned with the first feed surface 3 and which has not yet been moved, is lifted above the third feed surface 5 to deliver the layers of rolls 2 positioned on top of one another to the packaging machine 8 (see arrow F in FIG. 1).

Once the load on the elevator 7 has been picked up by the packaging machine 8, the elevator 7 is again aligned with the first feed surface 3 and the operations described above are repeated to deliver a new stack of three layers of rolls on top of one another to the packaging machine 8.

If necessary, before lifting the elevator 7 towards the packaging machine 8, the retaining walls 21, 22 are moved towards one another to compress the rolls 2 and produce a so-called space-saving layer configuration.

A control unit 25, connected to all of the motor or movement means indicated, coordinates and synchronizes movement of the elevator 7, the feed surfaces 3, 4, 5 and of the conveyor surface 12.

The invention described has evident industrial applications and can be modified an adapted in many ways without thereby departing from the scope of the inventive concept. Moreover, all details of the invention may be substituted by technically equivalent elements.

What is claimed is:

1. A unit for forming packs of products for a packaging machine, comprising a plurality of feed surfaces for layers of products and a receiving station for the layers of products, the receiving station comprising an elevator for transferring the layers of products to a packaging machine, the elevator being mobile only between a position for loading the products and a higher position for releasing the products, wherein there are three feed surfaces, respectively a first, second and third feed surface positioned on top of one another and comprising synchronization means for controlling the speed of the feed surfaces and moving the products on each feed surface at predetermined speeds so that the products reach ends of the respective feed surfaces at the same moment and the respective layers of products are simultaneously released onto the elevator.

2. The unit according to claim 1, wherein the synchronization means comprise three independent motors, each connected to a respective feed surface, for moving the packs of products on each feed surface at predetermined speeds.

3. The unit according to claim 2, wherein the three independent motors are operatively connected to a control unit for defining the speed at which the packs of products move on each feed surface.

4. The unit according to claim 3, wherein the elevator is aligned with the first feed surface in the loading position and is lifted higher than the third feed surface in the release position.

5. The unit according to claim 3, comprising a conveyor surface for transporting one after another a plurality of layers of products to the first, second and third feed surfaces.

6. The unit according to claim 3, comprising a first and a second containment wall located at the receiving station for providing lateral support for the layers of products.

7. The unit according to claim 2, wherein the elevator is aligned with the first feed surface in the loading position and is lifted higher than the third feed surface in the release position.

8. The unit according to claim 2, comprising a conveyor surface for transporting one after another a plurality of layers of products to the first, second and third feed surfaces.

9. The unit according to claim 2, comprising a first and a second containment wall located at the receiving station for providing lateral support for the layers of products.

10. The unit according to claim 1, wherein the synchronization means comprise a single motor operatively connected to the three feed surfaces.

11. The unit according to claim 10, comprising mechanical drive means operatively connected between the motor and the feed surfaces for moving the packs of products on each feed surface, at predetermined speeds.

12. The unit according to claim 11, wherein the mechanical drive means comprise a transmission chain directly connected to the motor and three reduction gears each connected to the transmission chain and to a single feed surface for moving each feed surface at a predetermined speed different from the speed of the other feed surfaces.

13. The unit according to claim 1, wherein the elevator is aligned with the first feed surface in the loading position and is lifted higher than the third feed surface in the release position.

14. The unit according to claim 1, comprising a conveyor surface for transporting one after another a plurality of layers of products to the first, second and third feed surfaces.

15. The unit according to claim 14, wherein the conveyor surface comprises a first, fixed end and a second, mobile end; the second, mobile end being able to move into alignment with the first, second and third feed surfaces, so as to alternately transport a layer of products to the first, second or third feed surface.

16. The unit according to claim 15, comprising motor means connected to the elevator and to the conveyor surface; the motor means being operated by a control unit for coordinating and synchronizing the movement of the elevator, the feed surfaces and the conveyor surface.

17. The unit according to claim 1, comprising a first and a second containment wall located at the receiving station for providing lateral support for the layers of products.

18. The unit according to claim 17, wherein the containment walls are parallel with one another and can be moved towards one another to laterally compress and compact the layers of products.

19. A method for forming packs of products to be transferred to a packaging machine, comprising the steps of alternately feeding one after another a first, second and third feed surface with respective layers of products, feeding said layers of products from the first feed surface onto an elevator located in a loading position, further comprising the steps of controlling the speed of the feed surfaces, synchronizing movement of the feed surfaces, moving the products on each feed surface at predetermined speeds so that the products reach the end of the respective feed surfaces at the same moment, releasing simultaneously the layers of products onto the elevator.

20. The method according to claim 19, wherein the step of alternately feeding one after another the first, second and third feed surfaces with layers of products comprises the steps of preparing a conveyor surface having a first, fixed end and a second, mobile end, moving said second, mobile end until it is aligned with the first, second and third feed surfaces and alternately transferring a layer of products to the first, second or third feed surface.

21. A unit for forming packs of products for a packaging machine, comprising a plurality of feed surfaces for layers of products and a receiving station for the layers of products, the receiving station comprising an elevator for transferring the layers of products to a packaging machine, the elevator being mobile only between a position for loading the products and a position for releasing the products, wherein there are three feed surfaces, respectively a first, second and third feed surface positioned on top of one another and comprising synchronization means so that they simultaneously release the respective layers of products onto the elevator, and wherein a first and a second containment wall, parallel with one another, are located at the receiving station for providing lateral support for the layers of products and for laterally compressing and compacting the layers of products, by moving the first and the second wall towards one another.

* * * * *